J. T. DRUMMOND.
CHAIN PROPELLER.
No. 254,468.  Patented Mar. 7, 1882.
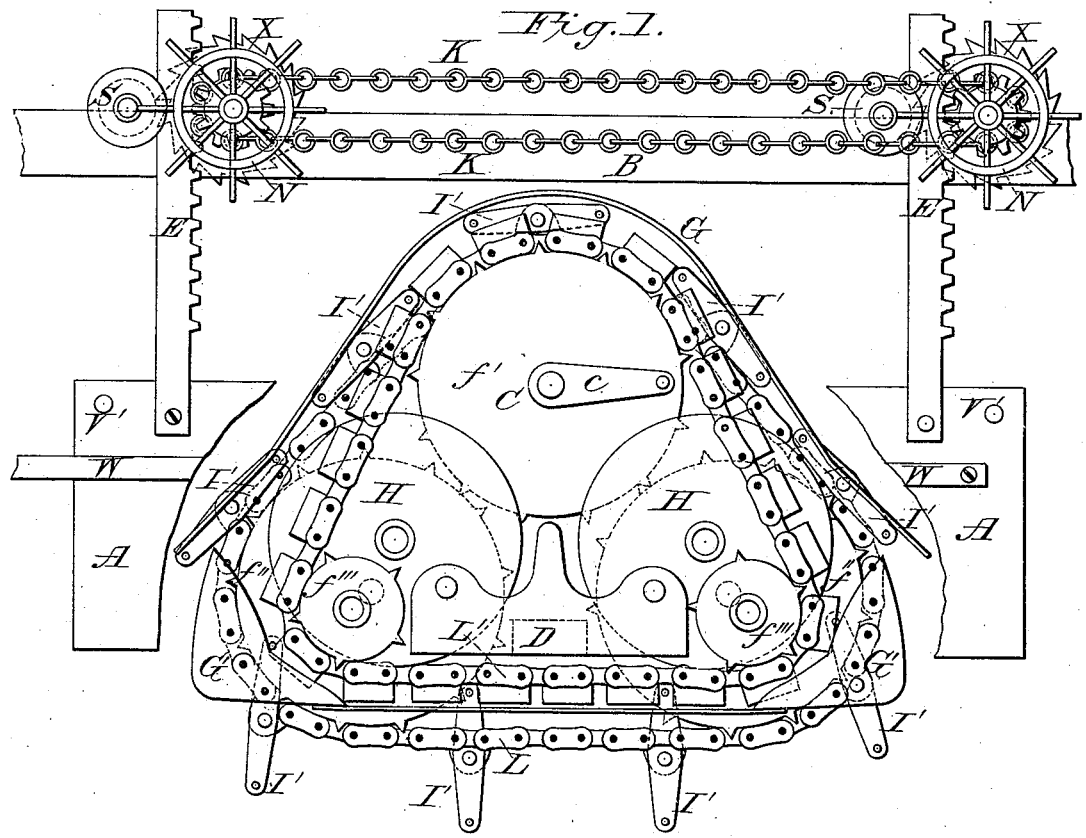
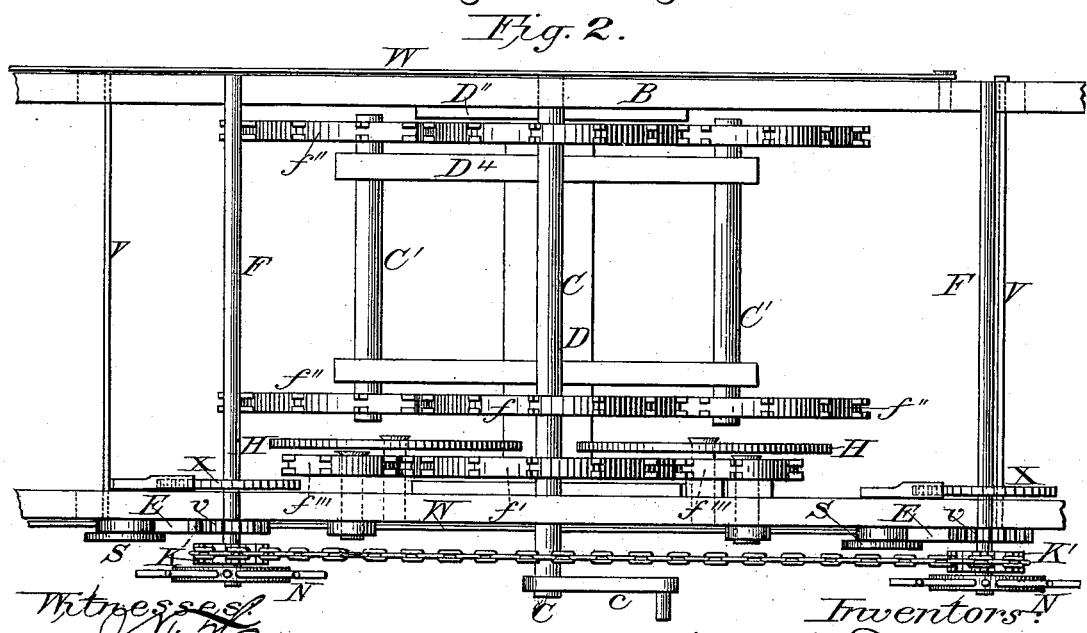

J. T. DRUMMOND.
CHAIN PROPELLER.

No. 254,468.                    Patented Mar. 7, 1882.

Witnesses:                              Inventor.
                                        James T. Drummond.

J. T. DRUMMOND.
CHAIN PROPELLER.
No. 254,468. Patented Mar. 7, 1882.
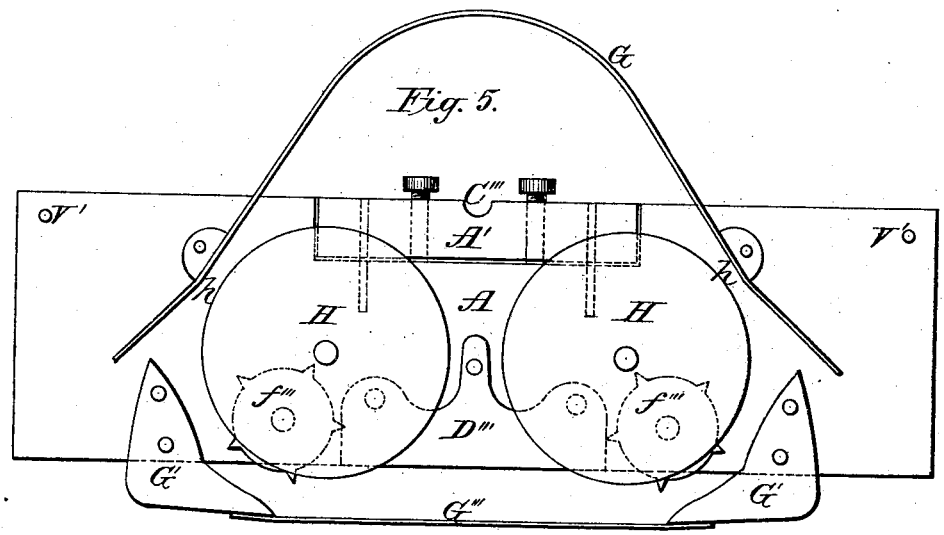
Fig. 5.
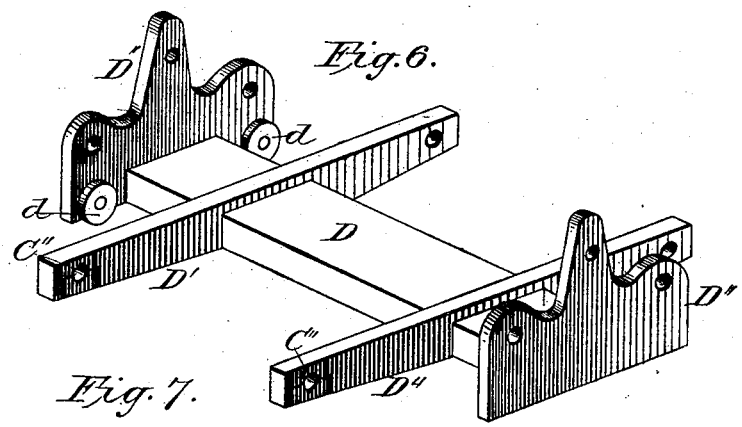
Fig. 6.
Fig. 7.
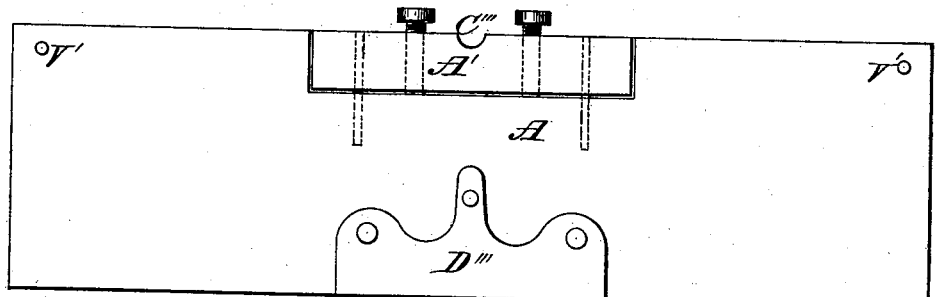
Witnesses:
J. F. Houseman
Butler Buchanan
Inventor:
James T. Drummond

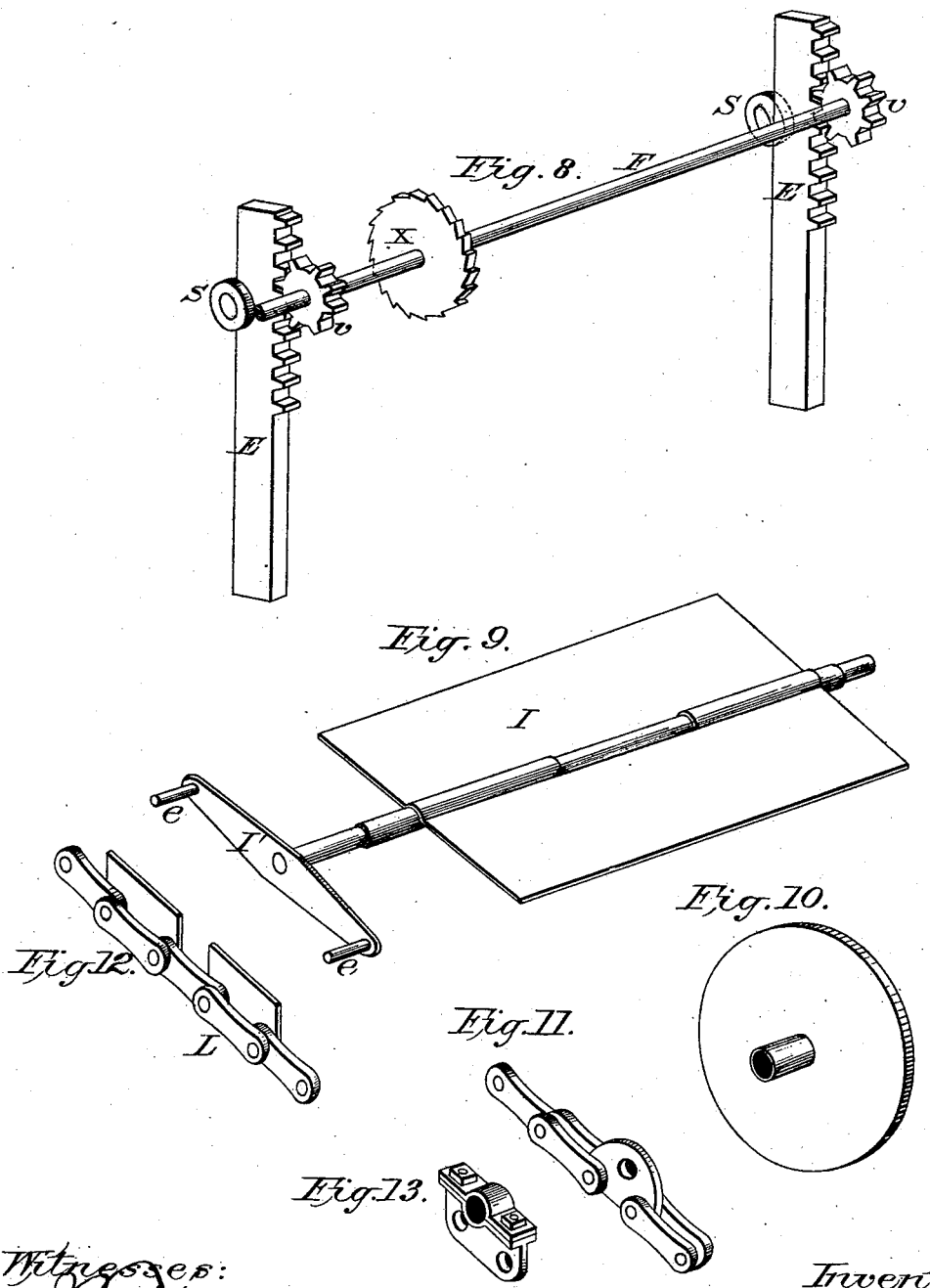

UNITED STATES PATENT OFFICE.

JAMES T. DRUMMOND, OF MOUNT PLEASANT, IOWA.

CHAIN-PROPELLER.

SPECIFICATION forming part of Letters Patent No. 254,468, dated March 7, 1882.

Application filed January 17, 1880.

*To all whom it may concern:*

Be it known that I, JAMES T. DRUMMOND, of Mount Pleasant, in the county of Henry and State of Iowa, have invented a new and useful Improvement in Propellers, of which the following is a specification.

The invention relates to improvements in that class known as "endless-chain propellers," designed for boats or vessels, and has for its object to provide a system of mechanism carrying and adjusting pivoted paddles in a vertical position while making a long horizontal stroke in the water and in a transverse position or edgewise during the other part of their circuit, thus utilizing the propelling power to the greatest advantage, thereby saving largely in the expense of propelling boats.

The invention consists in the combination of an endless adjusting-chain and a system of cams and revolving idlers, being arranged in close proximity beside and working in connection with another combination, consisting of revolving paddles pivoted at regular intervals to links of a pair of endless carrying-chains, which chains run over and are carried by sprocket-wheels so arranged as to give said paddles a long horizontal stroke in the water, and by means of the connections made between the appendages of said paddles and the adjusting-chain and cams the paddles are made to stand in a vertical position during their immersion in water and transversely in their backward stroke, all of which I hereinafter more definitely explain by reference to the accompanying drawings.

Figure 3:
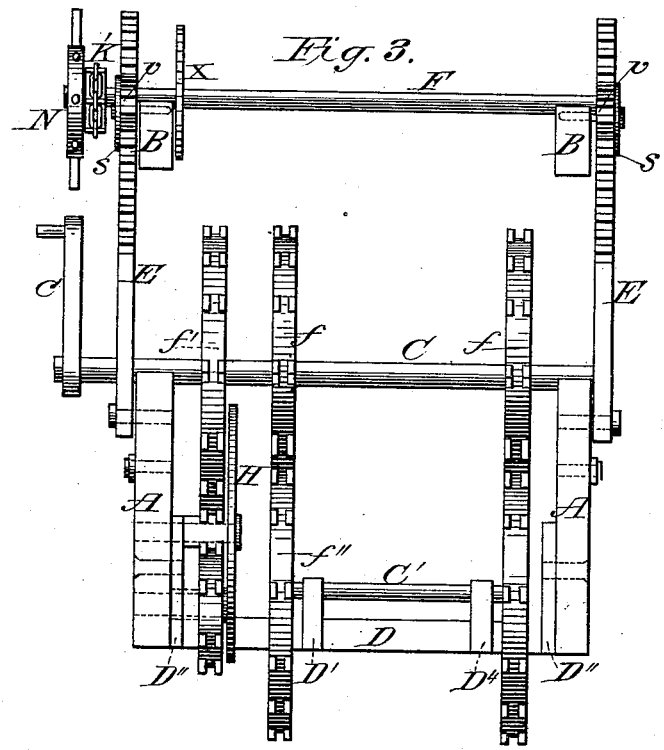
Figure 4:
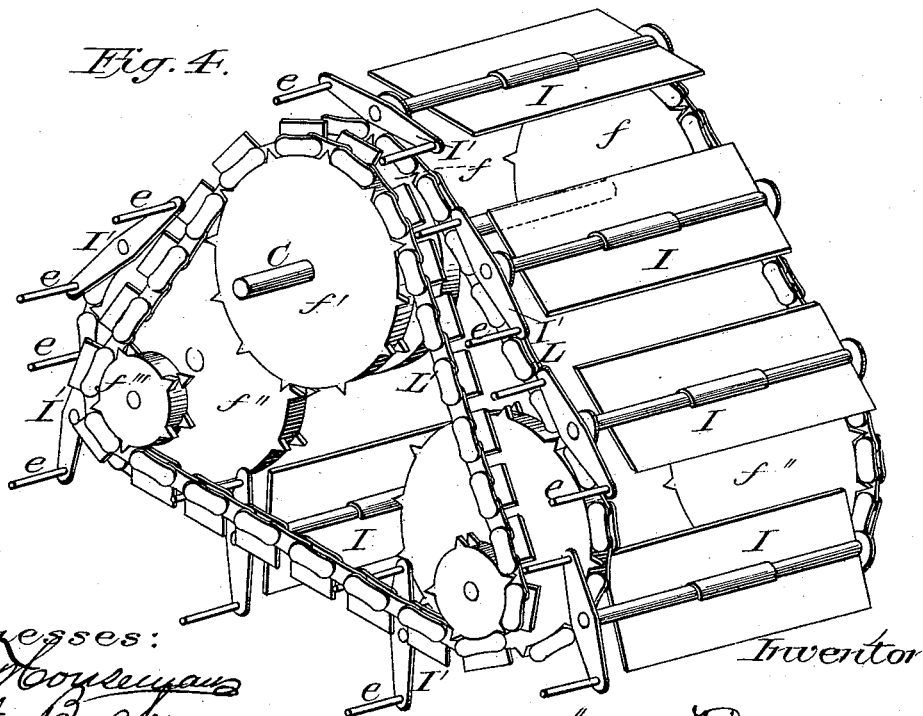

In said drawings, in which similar letters of reference indicate like parts, Figure 1 is a side elevation, showing the interior construction of the paddle combination embodying my invention, and also a supporting device arranged for adjusting said combination at different heights most suitable to its adaptation to or most effectual work in the water. Dotted lines in the drawings indicate parts hidden from view. Fig. 2 is a plan view of the same, looking from above, but having the chains and paddles out. Fig. 3 is an end elevation, also having the chains and paddles out. Fig. 4 is a perspective of part of the interior mechanism, showing the endless chains, sprocket-wheels, and paddles as combined. Fig. 5 is an elevation showing the inner side of one side piece of the frame-work of the machine, to which are attached cams and revolving idlers for operating the paddles as they pass through their circuit, and also the smaller sprocket-wheels, under which the adjusting-chain passes. Fig. 6 is a perspective of a frame-work connecting the frame-pieces, Figs. 5 and 7, and is also the support for the shafts upon which the lower outside sprocket-wheels under which the chains carrying the paddles run. Said frame has also pivoted to one flange two friction-rollers, under which the adjusting-chain passes. Fig. 7 is an elevation showing the inner side of the frame-piece on the opposite side to Fig. 5. Fig. 8 is a perspective of one shaft, with its pinions and ratchet, in combination with racks and flanged rollers, being part of the mechanism for elevating and lowering the paddle-frame. Fig. 9 is a perspective of one paddle detached. Fig. 10 is a perspective of one idler detached. Fig. 11 is a perspective of a small section of one of the endless carrying-chains, showing a pivot-link in which the paddles are journaled. Fig. 12 is a section of the endless adjusting-chain; and Fig. 13 is another form for making the pivot-links shown in Fig. 11, being made with the box to part for convenience in putting the device together.

A are side pieces of the main frame, to which the propelling mechanism is attached.

B are beams rigidly fastened to the boat, from which the paddle-frame A, with its attachments, is suspended by means of the racks E.

D is a connecting-beam, preferably made of metal, having flanges $D''$ on each end fitting the side pieces, as indicated at $D'''$ in Figs. 5 and 7, and to which are rigidly fastened the side pieces, A. To the beam D, in a transverse position, are rigidly attached the arms $D'$ and $D^4$, forming bearings for the shafts $C'$. The arm $D^4$ may, however, be dispensed with by extending the shafts $C'$ so as to form their outer bearings in the side piece, A. The parts A, D, $D'$, and $D^7$ constitute the main frame-work of the paddle combination.

C is the main driving-shaft, resting in bearings C''' of the pillow-blocks A' in the upper edge of the frame-pieces A, and has rigidly fastened on it the sprocket-wheels $ff$ and $f'$, all being of equal dimensions.

C' are shafts, being supported by the arms D' and D⁴, and have pivoted on their ends the sprocket-wheels $f''$. To the inner side of the frame-piece A, Fig. 5, are pivoted on wrists attached to said frame-piece the smaller sprocket-wheels $f'''$, and also in like manner the idlers H; also, to said pieces are attached cams G and G'. The cam G may, however, with equal effect be substituted by using two short cams instead—one at either end—as if the upper portion of said cam G, extending above the side piece, A, of the frame-work, were cut away.

L are flat-linked endless chains, having at regular intervals links provided with journal-boxes, (see Figs. 11 and 13,) into which the shafts of the paddles I are placed and revolve. Said paddles I are attached to and carried by said chains L.

L' is also an endless chain of flat links connected together by rivets, but provided with broader links on one side than on the other, as shown at Fig. 12, projecting outward, forming niches between the ends of said projections. On one end of the shafts of the paddles I are rigidly fixed in the same plane with said paddles the arms I', which are provided with pins $e$ in each end. (See Fig. 9.)

To the flange D'' at the end of the connecting-beam, Fig. 6, fitting at D''', Fig. 5, are pivoted rollers $d$, under which the chain L' is made to run in order to prevent said chain from rising off of the pins $e$ while the paddles are making their stroke in the water. The side pieces, A, of the frame are also stayed at their upper outside corners by means of rods V passing through them at V', and being fastened at their ends.

The operation of these devices is as follows: The chains L having the paddles I attached to them, and being placed on the sprocket-wheels $f$ and $f'''$, and the chain L' on the sprocket-wheels $f'$ and $f''''$, the shaft C is made to revolve either way, as desired, by means of power being applied to the crank $c$, causing the wheels $f$ and $f'$ to carry all of the chains L and L' at equal speed, and as the paddles I are carried over the curves formed by the wheels $f''$ the hinder pins $e$ in the paddle-arms I' are depressed by means of the inward bends of the cams G, so as to revolve the paddles, throwing the forward pins up, so as to pass over and outside of the upper point of the cam G', and as they farther advance, the paddle-shaft, being carried through the converging curve, causes the forward pin $e$ of the arms I' to strike the outer lower corner of the cam G', so as to cause the hinder pin to pass downward on the inside of said cam, and as it passes under the short curve of the chain L' caused by the wheel $f'''$ said pin takes into one of the niches formed by the projecting links of said chain, and as all the chains travel at equal speed said paddles are held in a vertical position until they arrive at the curve at the opposite end of the device, when, by means of the pressure of water against the paddle or the upper pin striking the verge of the idler H, it becomes detached from the chain L', and in advancing still farther the now forward pin in the new direction (the position having been reversed) passes upward outside of the idler H and inside of the cam G, while the hinder pin, after passing outside of the cam G', takes in under the lower point of the cam G, and by means of either the chain L' or the cam G the paddles are prevented from turning, and are thus carried in a transverse or edgewise position in their return or backward stroke. The idlers H also serve to disconnect the pins $e$ from the chain L' in the descent of the paddles in approaching the water, so as to allow a new connection in a vertical position in passing the curve at the wheels $f'''$.

To the side pieces, A, of the frame-work are pivoted the racks E, which, by means of the pinions $v$, (see Fig. 8,) are caused to move vertically as the shafts F are revolved, thus raising or lowering the paddle combination as the boat may be heavily or lightly loaded. Said shafts F are revolved by means of hand-wheels N (see Figs. 2 and 3) or by other known analogous devices, and are held to a proper position by means of ratchets X, the same being properly provided with pawls.

The racks E are held to the pinions $v$ and also to the beams B by means of the flanged rollers $s$. The two shafts F are also coupled together by means of the chain K (see Figs. 1 and 2) working over pulleys K' on said shafts, so as to cause them to revolve in unison one with the other, thereby maintaining equal height of the two ends of the propeller at all times. On each side of the paddle-frame are attached stay-bars W, which are pivoted at one end to the frame-pieces A and at the other end to fixtures rigidly fastened to the boat. The length of said bars between pivoting-points is equal to the length between the pivoting-points of a driving-pitman connecting said propeller with a motive power, the object of which is to keep the axis of the propeller or shaft C at all times and through all of the different vertical adjustments of the propeller in exact radial distance from the driving-power, so that the end of said pitman, working on the wrist of the crank $c$, will revolve around the axis or shaft C by means of the oscillating motion given it by its connection at the other end with an engine, thus connecting the driving-power with the propeller.

In the upper edge of the frame-pieces A are provided adjustable pillow-blocks A', which are made to slide upward on pins passing through them, which pins are rigidly fastened into said pieces A, said blocks being operated by means of screws which pass tightly downward through them, causing their points to press against bearings in the frame-pieces A, by which means the slack of the chains L and chain L' is taken up by said blocks being raised as the bearings of the shaft C, carrying the wheels $f$ and $f'$, are at C'''.

To the lower points of the cams G' is attached a fender-bar, G''', for the purpose of preventing drift or floating objects from taking in over the points of said cams.

Having thus fully described my invention, so as to enable others skilled in the art to understand the same, what I claim as new, and desire to secure by Letters Patent, is—

An endless chain-propeller for boats, consisting of the chains L, chain L', pivoted paddles I, being provided with arms I', having pins $e$ attached thereto, cam G, cams G', idlers H, sprocket-wheels $f, f', f''$, and $f'''$, shaft C, shafts C', and crank $c$, in combination with the frame-work A, D, D', and $D^4$, all substantially as herein arranged and for the purposes specified.

JAMES T. DRUMMOND.

Witnesses:
J. F. HOUSEMAN,
BUTLER BUCHANAN.